United States Patent
Cross (10) Patent No.: US 11,009,304 B2
(45) Date of Patent: May 18, 2021

(54) TELESCOPING CONTROLLED FORCE SPRING

(71) Applicant: 1065210 B.C. Ltd., Abbotsford (CA)

(72) Inventor: David Cross, Abbotsford (CA)

(73) Assignee: 1065210 B.C. LTD., Abbotsford (CA)

( * ) Notice: Subject to any disclaimer, the term of this patent is extended or adjusted under 35 U.S.C. 154(b) by 0 days.

(21) Appl. No.: 16/341,672

(22) PCT Filed: Oct. 13, 2017

(86) PCT No.: PCT/CA2017/051223
§ 371 (c)(1),
(2) Date: Apr. 12, 2019

(87) PCT Pub. No.: WO2018/068151
PCT Pub. Date: Apr. 19, 2018

(65) Prior Publication Data
US 2020/0003509 A1    Jan. 2, 2020

(30) Foreign Application Priority Data

Oct. 13, 2016 (CA) ...................................... 2945223
Oct. 13, 2016 (CA) ...................................... 2945224

(51) Int. Cl.
*F16F 1/04*        (2006.01)
*F41A 9/64*        (2006.01)
(Continued)

(52) U.S. Cl.
CPC ...... *F41A 9/63* (2013.01); *F41A 9/68* (2013.01); *F41A 9/70* (2013.01); *F41A 9/71* (2013.01)

(58) Field of Classification Search
CPC ...... A47C 27/064; B25B 23/141; F16F 1/047; F41A 9/64; F41A 9/70; F41A 9/71
(Continued)

(56) References Cited

U.S. PATENT DOCUMENTS

| 274,715 A | * | 3/1883 | Buckley ................. F16F 1/04 |
| | | | 267/180 |
| 4,397,453 A | | 8/1983 | Seecamp |

(Continued)

FOREIGN PATENT DOCUMENTS

| CA | 2444265 C | 10/2002 |
| GB | 206316 A | 11/1923 |

(Continued)

OTHER PUBLICATIONS

Examiner's Report issued for Canadian Patent Application No. 2,945,223, Canadian Intellectual Property Office, dated Feb. 9, 2017.

(Continued)

*Primary Examiner* — Christopher P Schwartz
(74) *Attorney, Agent, or Firm* — Dentons Canada LLP (57) ABSTRACT

A spring comprises a continuous wire member formed into a plurality of coils along a central axis. Each of the plurality of coils comprises a plurality of straight portions extending between bend portions each extending from one of the straight portions. The plurality of coils form a first spring body and a second spring body, each spring body comprising at least three coils and having a first end and a second end with the first end of the second spring body connected to the second end of the first spring body. In an unloaded state the first spring body has a first unique pitch distance between bend portions of each pair of adjacent coils and the first unique pitch distance decreases from the first end of the first spring body to the second end of the first spring body, and the second spring body has a second unique pitch distance between bend portions of each pair of adjacent coils and the second unique pitch distance increases from the first end of the second spring body to the second end of the second spring body.

14 Claims, 7 Drawing Sheets

(51) Int. Cl.
*F41A 9/63* (2006.01)
*F41A 9/68* (2006.01)
*F41A 9/70* (2006.01)
*F41A 9/71* (2006.01)

(58) Field of Classification Search
USPC .... 267/174, 175, 177, 180; 42/49.01, 49.02, 42/50
See application file for complete search history.

(56) References Cited

U.S. PATENT DOCUMENTS

| | | | |
|---|---|---|---|
| 5,868,383 | A | 2/1999 | Codos |
| 8,099,811 | B2* | 1/2012 | Gladney ............. A47C 23/043 5/716 |
| 2004/0169322 | A1 | 9/2004 | Ogura et al. |
| 2006/0042016 | A1* | 3/2006 | Barman ............. A47C 23/043 5/716 |
| 2011/0169205 | A1* | 7/2011 | Kempf ................. F16F 1/047 267/180 |
| 2015/0121736 | A1 | 5/2015 | Faifer |
| 2017/0335914 | A1* | 11/2017 | Thomas ............. A47C 27/064 |
| 2020/0032855 | A1* | 1/2020 | Walz ................. B25B 23/141 |

FOREIGN PATENT DOCUMENTS

| | | |
|---|---|---|
| KR | 10-1410357 B1 | 7/2014 |
| NL | 9300277 A | 9/1994 |
| WO | 02/06749 A1 | 1/2002 |
| WO | 2014/003330 A1 | 1/2014 |

OTHER PUBLICATIONS

International Search Report and Written Opinion for PCT/CA2017/051223, International Searching Authority, dated Jan. 23, 2018.
Supplementary Partial European Search Report and Provisional Opinion issued in connection with European patent application No. EP 17859855.3, European Patent Office, dated Jun. 17, 2020.
Search Report issued in connection with Chinese Patent Application No. 201780076805.6, China National Intellectual Property Administration, dated Jun. 22, 2020.
Office Action issued in connection with Chinese Patent Applicatin No. 201780076805.6, China National Intellectual Property Administration, dated Jun. 29, 2020.
Extended European Search Report and Search Opinion issued in connection with European patent application No. EP 17859855.3, European Patent Office, dated Sep. 25, 2020.
Search Report issued in connection with related Chinese patent application No. 201780076805.6, China National Intellectual Property Administration, dated Jan. 6, 2021.
Office Action issued in connection with related Chinese patent application No. 201780076805.6, China National Intellectual Property Administration, dated Jan. 13, 2021.

* cited by examiner

TELESCOPING CONTROLLED FORCE SPRING

CROSS-REFERENCE TO RELATED APPLICATIONS

This application claims the benefit of priority of Canadian Patent Application No. 2,945,223 and Canadian Patent Application No. 2,945,224, both of which were filed on Oct. 13, 2016 and are hereby incorporated herein by reference in their entirety.

TECHNICAL FIELD

The present invention relates to springs. Particular embodiments provide a magazine spring having increased compression and more controlled spring rates.

BACKGROUND

Many firearms use a magazine to store and feed ammunition. Magazines are available in a variety of shapes and sizes, with the detachable box magazine being most common. A detachable box magazine can be loaded or unloaded when detached from the corresponding firearm. As necessary, one magazine can be detached from the firearm and replaced with another loaded magazine.

A basic box magazine commonly comprises a body into which the ammunition is loaded, a feed mechanism, which includes a compression spring with a follower, a spring plate and a floorplate. Ammunition is loaded into the magazine, above the follower, compressing the spring. As ammunition is used, the spring provides an expansive force between the floorplate and the follower, raising the ammunition within the magazine.

The maximum capacity of ammunition able to be loaded into a magazine is determined by the space therein. The total space within the magazine is set by the geometry of the cartridge and internal volume of the magazine body and is limited by the height of the compressed state of the follower spring. The solid height for compression springs is the point at which the wires in the spring are in contact, and additional force will not compress the spring further. The free length of the magazine spring is the height of the spring in the uncompressed state, when no force is applied. The spring free length must be sized to the magazine such that the spring provides sufficient force to load all of the rounds of ammunition into the attached firearm.

Typically, a magazine spring is in the form of a stacked coil. When compressed, the solid height is set by the number of coils and the diameter of those coils. To allow for the maximum number of ammunition rounds within a magazine, it is desirable to have the smallest solid height possible, while still maintaining the desired free length and spring force to feed the final round into the firearm.

With a typical stacked coil compression spring, the spring rate is linear such that the force the spring exerts on an object is directly proportional to the distance that the spring travels. Therefore, when a compression spring is in the fully compressed position at solid height, it exerts a maximum amount of force. In some cases, the amount of force exerted when the spring is at solid height can impede the action of loading the ammunition into the firearm due to excessive force. This can also result in firearm malfunctions as the force exerted by the spring decreases as it extends back to the installed height of the spring. In such cases, to reduce loading complications, the operator may choose to not fully load the magazine to the point where the follower spring is at solid height, thereby reducing the number of rounds available for use.

U.S. Pat. No. 4,397,453 to Seecamp describes a self-telescoping cartridge magazine spring having two sizes of coils, evenly distributed at the free length such that there is a consistent pitch between coils. While this design reduces the solid height compared to typical follower springs, such design is still limited by the number of coils as such coils will stack on each other. Additionally, fixed pitch between coils does not result in the desired variable spring rate to ensure a constant spring force, but increases the force compared to traditional stacked coil magazine springs.

SUMMARY

One aspect of the present invention provides a spring comprising a continuous wire member formed into a plurality of coils along a central axis. Each of the plurality of coils comprises a plurality of straight portions extending between bend portions each extending from one of the straight portions. The plurality of coils form a first spring body and a second spring body, each spring body comprising at least three coils and having a first end and a second end with the first end of the second spring body connected to the second end of the first spring body. In an unloaded state the first spring body has a first unique pitch distance between bend portions of each pair of adjacent coils and the first unique pitch distance decreases from the first end of the first spring body to the second end of the first spring body, and the second spring body has a second unique pitch distance between bend portions of each pair of adjacent coils and the second unique pitch distance increases from the first end of the second spring body to the second end of the second spring body.

The first spring body each of the plurality of coils may be sized to be received within a preceding coil and in the second spring body each of the plurality of coils is sized to be received within a succeeding coil such that in a compressed state a combined height of the first and second spring bodies is twice a diameter of the wire member.

Each of said plurality of coils may comprise two straight portions extending along planes substantially parallel to each other and said central axis of said spring and first and second bend portions each extending from one of said straight portions. Each of said first and second bend portions may include an entrance portion and an exit portion. The exit portion may have a bend radius less than said entrance portion. Each of said first and second bend portions of each coil may comprise a reducing radius helical bend. Each of said first and second bend portions of each coil may extend around a curvature of 180 degrees.

In the first spring body each of said straight portions of each of said coils may have a length less than a preceding straight portion, and in the second spring body each of said straight portions of each of said coils may have a length greater than the preceding straight portion.

Each of said straight portions of each of said coils may be oriented at a pitch angle relative to said central axis, and in the first spring body the pitch angle may increase from the first end of the first spring body to the second end of the first spring body, and in the second spring body the pitch angle may decrease from the first end of the second spring body to the second end of the second spring body.

In some embodiments, the plurality of coils form a plurality of pairs of first and second spring bodies continuously formed endwise with each other.

In some embodiments, the continuous length of wire has a uniform cross section therealong.

Other aspects and features of the present invention will become apparent to those ordinarily skilled in the art upon review of the following description of specific embodiments of the invention in conjunction with the accompanying figures.

DRAWINGS

The following figures set forth embodiments in which like reference numerals denote like parts. Embodiments are illustrated by way of example and not by way of limitation in the accompanying figures.

In drawings which illustrate embodiments of the invention wherein similar characters of reference denote corresponding parts in each view.

DETAILED DESCRIPTION

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Figure 1:
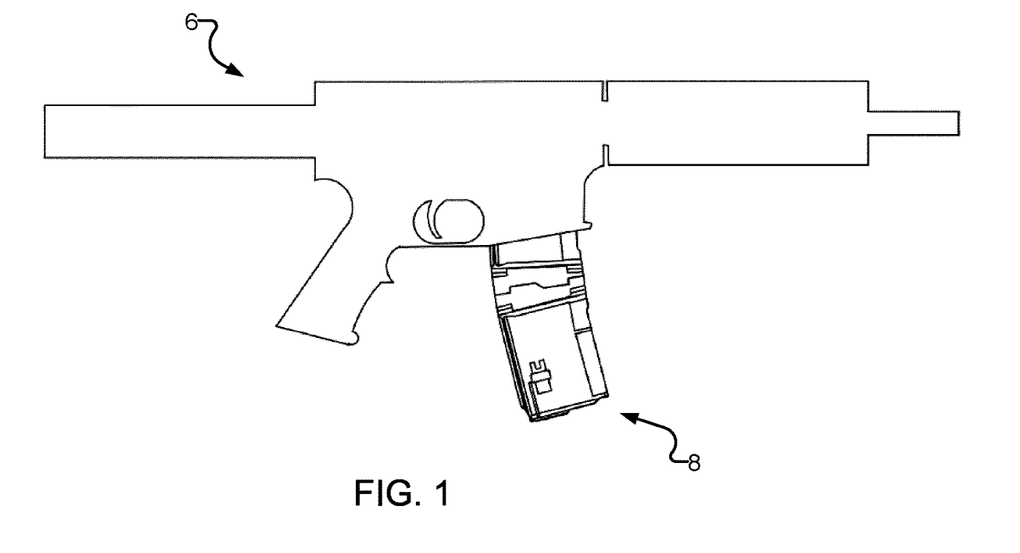
FIG. 1 is a diagrammatic view of a firearm with an attached magazine according to one embodiment of the present invention.
Figure 2:
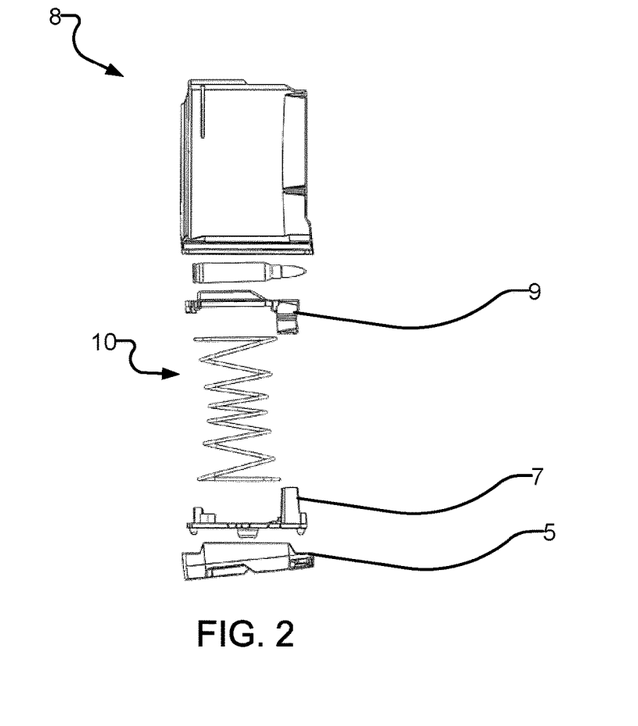
FIG. 2 is an exploded view of the magazine of FIG. 1.

Referring to FIG. 1, a firearm with an attached magazine 8 is generally shown at 6. FIG. 2 illustrates an exploded view of the magazine, with a telescoping spring shown generally at 10. The spring 10 is approximately oval shaped when viewed from the top/bottom (see, for example, the plan view shown in FIG. 4), to fit within the rectangular magazine body 4, between a follower 9 and a spring plate 7 and floor plate 5, as are commonly known.

Figure 2A:
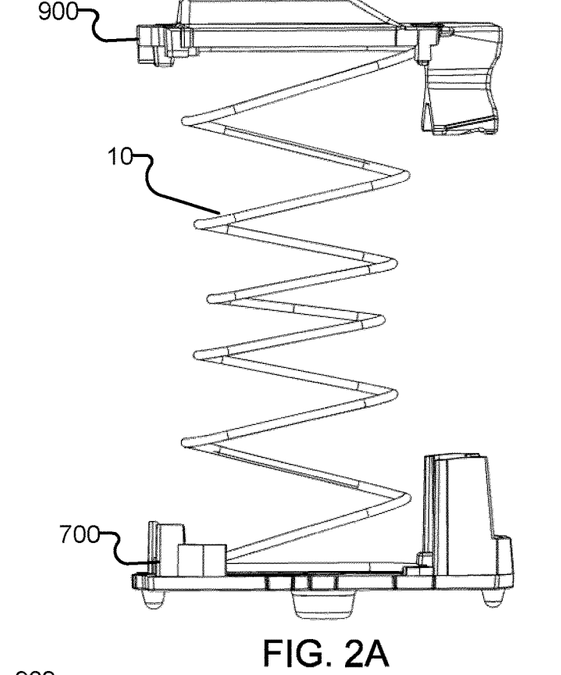
FIG. 2A shows the spring of FIG. 2 mounted between a spring plate and a follower according to one embodiment of the present invention.
Figure 2B:
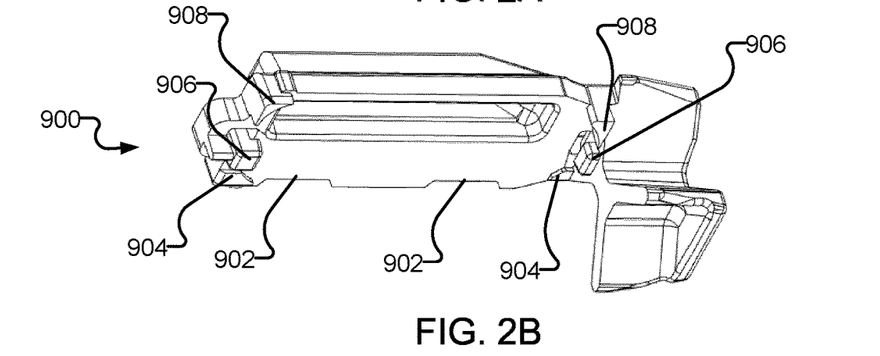
FIG. 2B shows the follower of FIG. 2A in isolation.
Figure 2C:
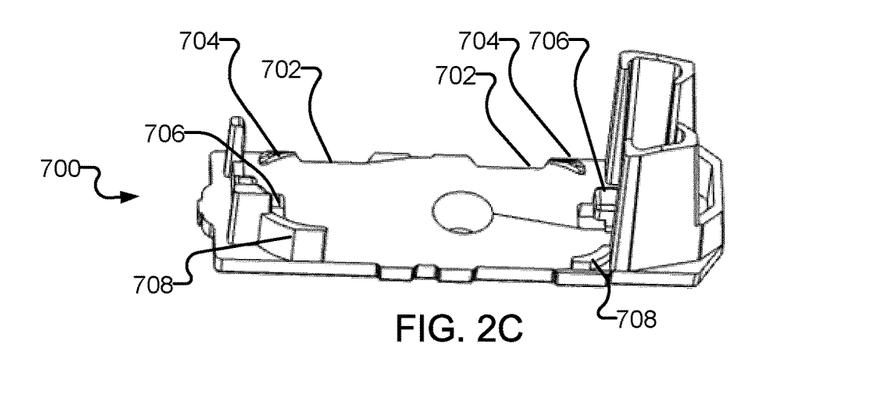
FIG. 2C shows the spring plate of FIG. 2A in isolation.

FIG. 2A shows the spring 10 mounted between a spring plate 700 and a follower 900 according to one embodiment of the invention. As best seen in FIGS. 2B and 2C, the follower 900 and spring plate 700 respectively have relief grooves 902 and 702 in the sides thereof to facilitate assembly, to allow the ends of the spring 10 to be pressed into the spring plate 700 and follower 900, as described below. The spring plate 700 comprises tapered protrusions 704 which permit an end portion of the spring to slide thereover during insertion, clips 706 to retain the end portion of the spring 10, and stops 708 to hold the end portion of the spring 10 in place once inserted. Similarly, the follower 900 comprises tapered protrusions 904 which permit an end portion of the spring to slide thereover during insertion, clips 906 to retain the end portion of the spring 10, and stops 908 to hold the end portion of the spring 10 in place once inserted. The tapered protrusions 704 and 904 are shaped to allow the end portions of the spring 10 to be inserted into the spring plate 700 and follower 900, but resist removal of the end portions of the spring 10 from the spring plate 700 and follower 900.

Figure 2D:
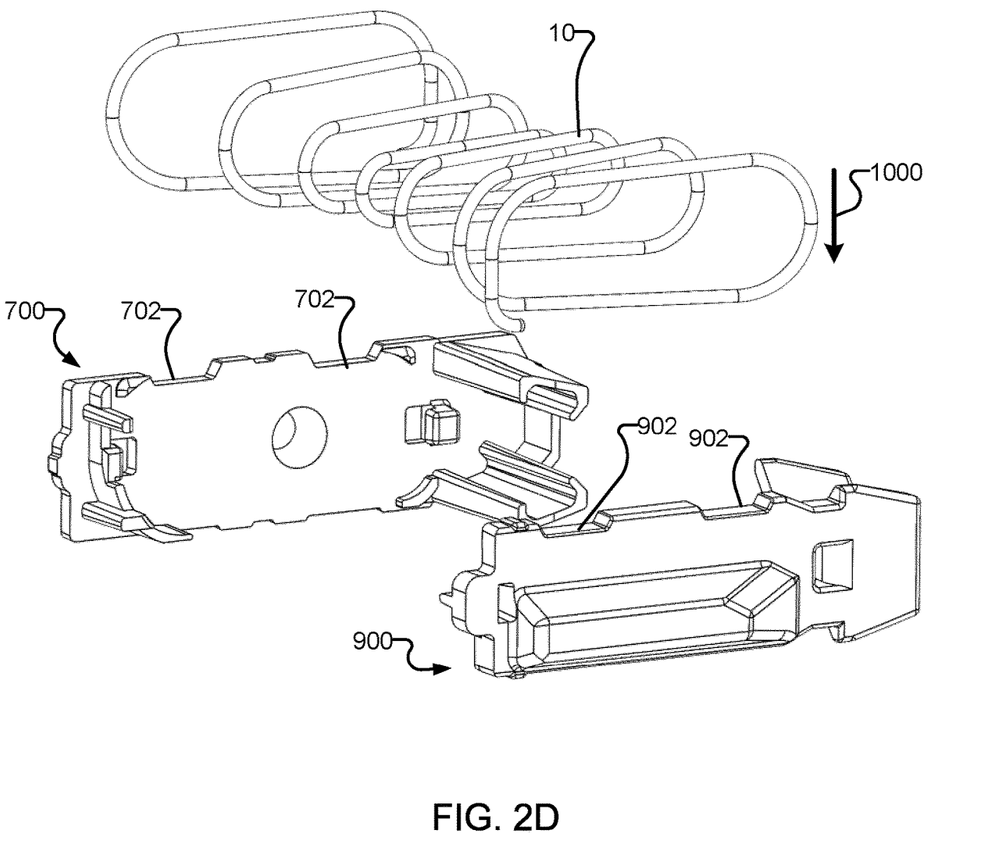
FIG. 2D shows the spring being pressed into the spring plate and follower of FIG. 2A.

To assemble the spring 10 into the spring plate 700 and follower 900, the spring 10 only needs to be pressed into the spring plate 700 and follower 900 from the side having the relief grooves 702 and 902, as indicated by arrow 1000 in FIG. 2D. The leading edges of the end portions of the spring 10 will then slide over tapered protrusions 704 and 904, under clips 706 and 906, and abut stops 708 and 908, at which point the trailing edges of the end portions of the spring 10 will be retained by the tapered protrusions 704 and 904.

Figure 3:
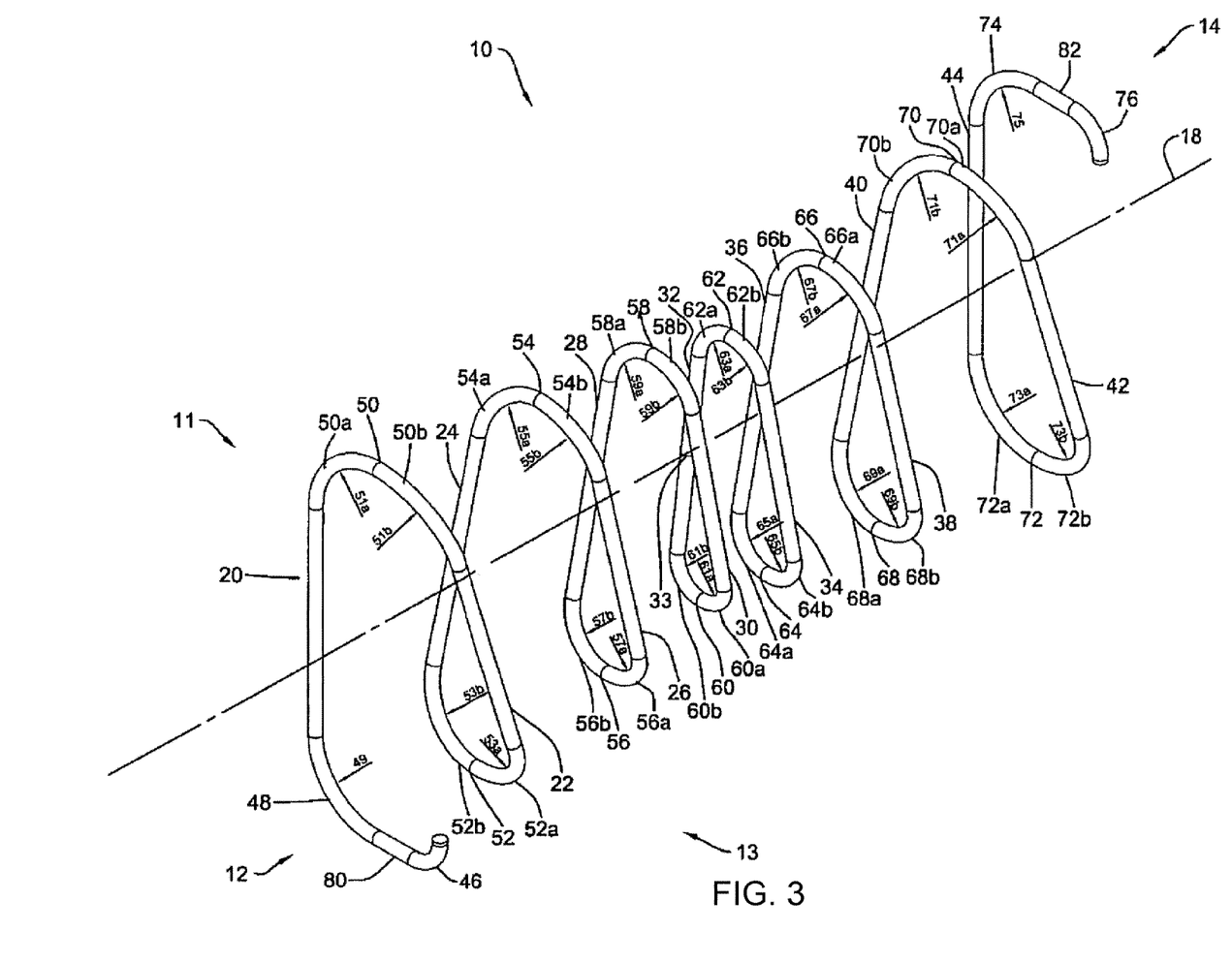
FIG. 3 is a perspective view of the spring of FIG. 2.
Figure 4:
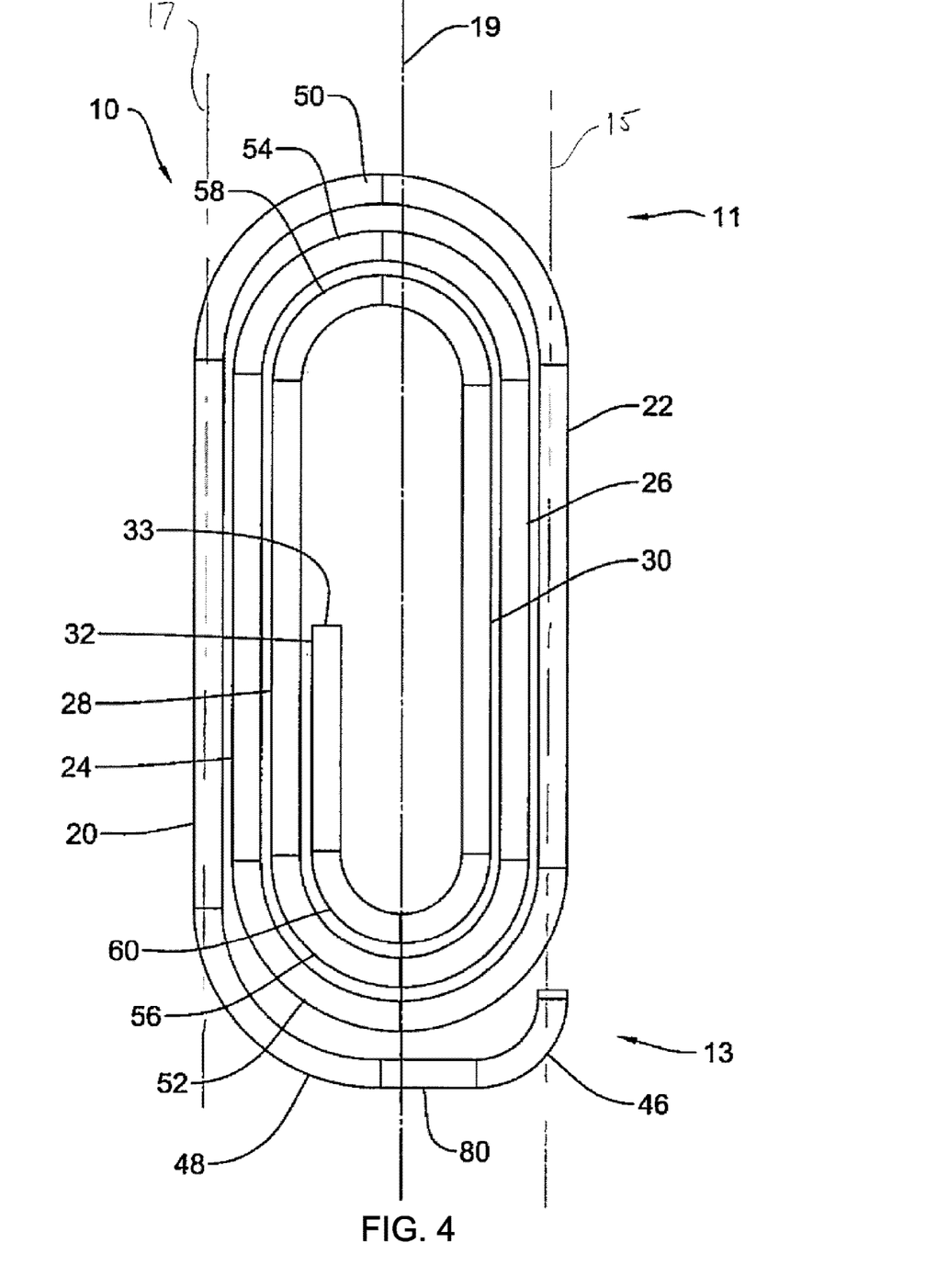
FIG. 4 is a plan view of half of the spring shown in FIG. 2.
Figure 5:
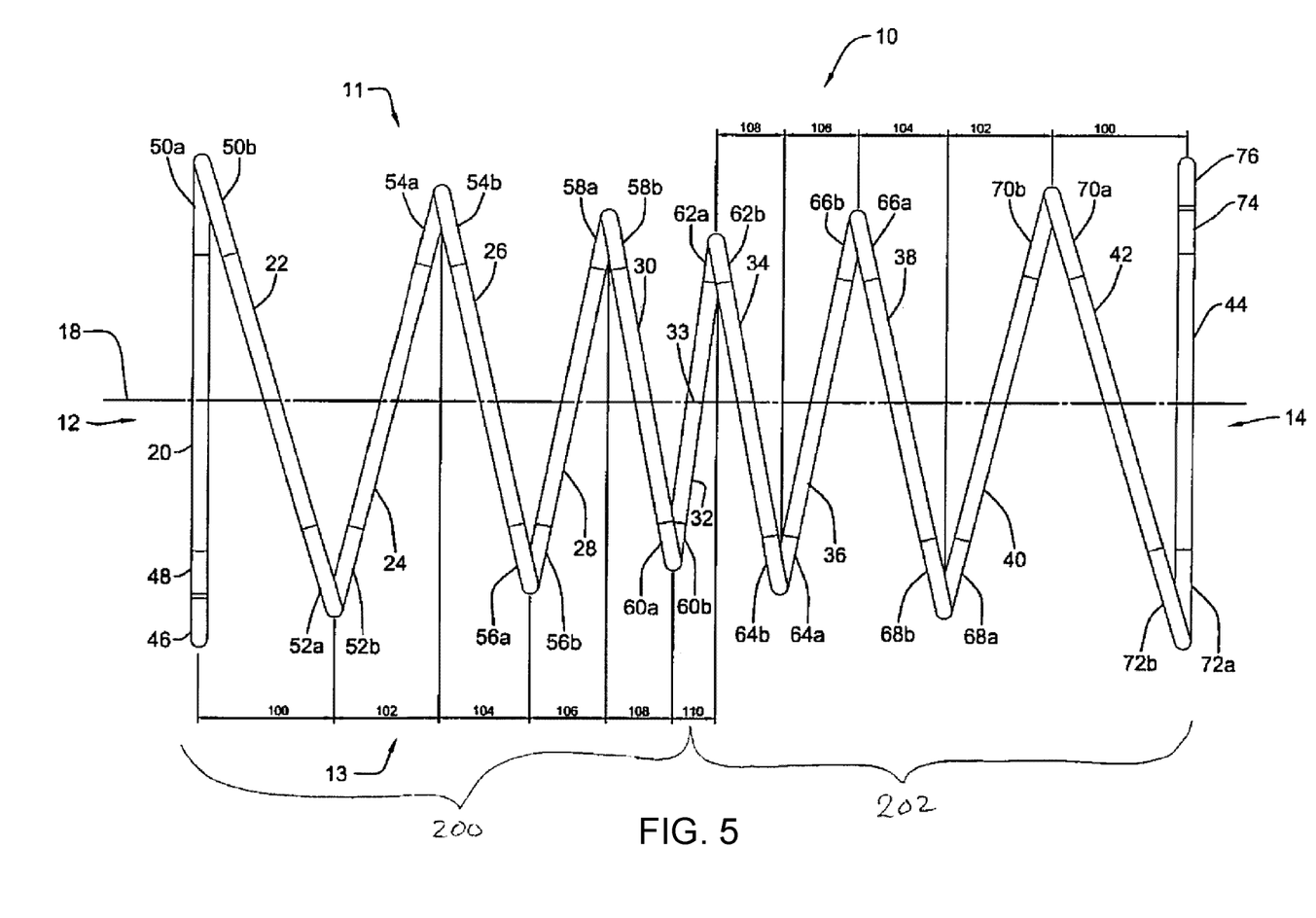
FIG. 5 is a side view of the spring of FIG. 2 in the relaxed position, showing the free length.

Referring to FIGS. 3-5, a telescoping spring 10 of FIG. 2 is shown in detail. As best seen in FIGS. 3 and 5, spring 10, extending between first and second ends 12 and 14, respectively, extending along an axis 18, is comprised of a plurality of alternating curved and straight portions, as will be more fully described below. As illustrated in FIGS. 3 and 4, the spring 10 has first and second sides, 11 and 13, respectively. The spring is formed of a first spring body 200 extending between the first end 12 and a midpoint 33 of the spring and a second spring body 202 extending between the midpoint 33 and the second end 14 of the spring. As will be more fully described below each successive coil of the first spring body fits within the preceding coil from the first end and similarly each coil of the second spring body 202 fits within its preceding coil from the second end 14 such that the fully compressed spring will only occupy a height of two diameters of the spring wire.

As illustrated in FIG. 3, the first and last curves of the spring 10 includes first and second end curves 46 and 76, respectively, proximate to the first and second ends 12 and 14, respectively, and two half curved wire portions, 48 and 74, respectively, with straight portions 80 and 82 therebetween. As best seen in FIG. 3, the first and second end curves 46 and 76 are both on the same side of the spring 10, to facilitate assembly of the spring 10 into a magazine as discussed above. Proximate to first end 12, straight portion 20 may define a first plane 17 illustrated in FIG. 4 perpendicular to axis 18 in the relaxed or initial position. Furthermore, straight portion 22 may define a second plane 15 also illustrated in FIG. 4 in the relaxed or initial position of the spring. The first and second planes are aligned to be substantially parallel to each other and to the axis 18 so as to form a rectangular shaped spring as illustrated. Each of the curved portions defines an arc of 180° such that the straight portions connected thereto may be substantially parallel to each other. It will be appreciated however that other spring shapes may also be utilized such as hexagonal, triangular or square as required by adding more or less straight portions as part of each coil of the spring 10.

Extending between straight portion 20 and midpoint 33, a plurality of curves, 50, 52, 54, 56, 58, 60, 62, and straight portions, 20, 22, 24, 26, 28, 30, 32, are each nested within each other, such that each subsequent curve is smaller in radius than the preceding curve, and each subsequent straight portion is smaller in length than the preceding straight portion. The spring is mirrored at midpoint 33, such that extending between straight portion 44 and midpoint 33, a plurality of curves, 72, 70, 68, 66, 64, 62, and straight portions, 44, 42, 40, 38, 36, 34, are nested within each other, such that each subsequent curve is smaller in radius than the preceding curve, and each subsequent straight portion is smaller in length than the preceding straight portion. Although twelve curves are illustrated in the present embodiment between straight portions 20 and 44, it can be appreciated that more or less curves may be useful, as well.

Starting at first end 12, the radius 49 of half curved wire portion 48 may have a similar radius 51a to curved portion 50a. Subsequent curves along the spring 10 starting from the first end 12, and progressing towards midpoint 33, have progressively smaller radii. Each curve has an entrance a and an exit b, which may have the same or different radii. In particular, curve 50 may be sized such that entrance 50a and exit 50b have substantially similar radii 51a and 51b. Curve 62 may be sized such that entrance 62a has a similar radius 63a to the radius 63b of exit 62b. Remaining curves may be sized such that entrances have larger radii than exits. In particular, the radius 55a of curve 54a may be sized to fit within curve 50a. Similarly, the radius 55b of curve 54b is selected to permit curve 54b to fit within curve 50b. Similarly, each subsequent radius is selected to permit its curvature to fit within the curve preceding that curve on the same side of the spring. In such a manner, each of curves 52, 54, 56, 58 and 60, and their respective radii 53a/53b, 55a/55b, 57a/57b, 59a/59b and 61a/61b, may be sized to fit within the preceding curve on the same side of the spring. In a similar manner to the above, the radii 65a, 65b, 67a, 67b, 69a, 69b, 71a, 71b, 73a, 73b and 75 are selected to be progressively larger to permit that curved portion 64a, 64b, through to 74 to surround the preceding curve on the same side 11 or 13 of the spring 10.

Between the half curved portion 48 at first end 12 and the half curved portion 74 at second end 14, a plurality of straight wire portions 20, 22, 24, 26, 28, 30, 32, 34, 36, 38, 40, 42, 44 are disposed between the curved portions. The straight sections are progressively shorter between half curved portion 48 and midpoint 33, then progressively longer between midpoint 33 and half curved portion 74 at second end 14. The straight sections, with the exception of the two short end straight sections 80 and 82 are disposed substantially parallel to a central plane 19, as shown in FIG. 4. Short end straight portion 80 joins curved end portion 46 and half curved portion 48; straight portion 20 joins half curved portion 48 and curved portion 50; straight portion 22 joins curved portion 50 and curved portion 52; straight portion 24 joins curved portion 52 and curved portion 54; straight portion 26 joins curved portion 54 and curved portion 56; straight portion 28 joins curved portion 56 and curved portion 58; straight portion 30 joins curved portion 58 and curved portion 60; straight portion 32 joins curved portion 60 and curved portion 62; straight portion 34 joins curved portion 62 and curved portion 64; straight portion 36 joins curved portion 64 and curved portion 66; straight portion 38 joins curved portion 66 and curved portion 68; straight portion 40 joins curved portion 68 and curved portion 70; straight portion 42 joins curved portion 70 and curved portion 72; straight portion 44 joins curved portion 72 and half curved portion 74; short end straight portion 82 joins half curved portion 74 and end curved portion 76.

Figure 6:
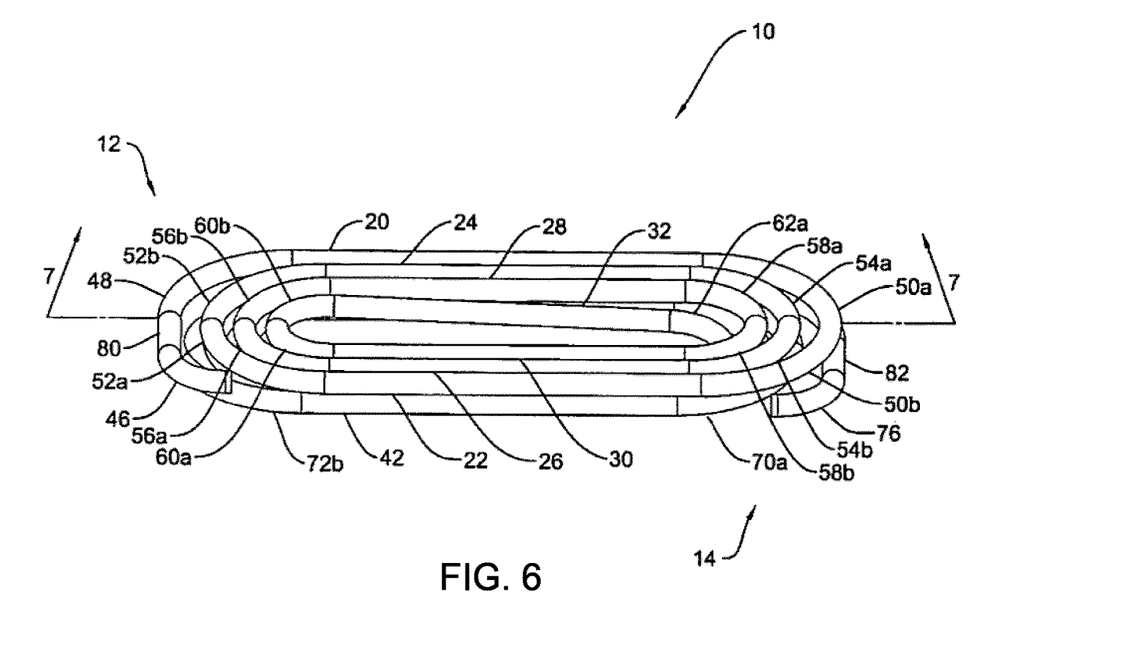
FIG. 6 is a perspective view of the spring of FIG. 2 in the compressed position, showing the solid height.
Figure 7:
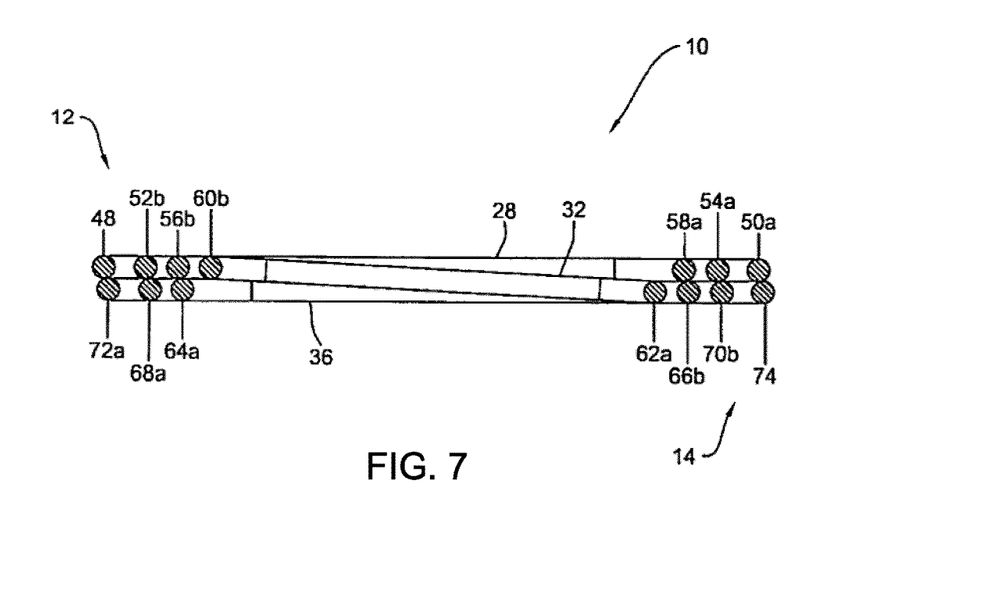
FIG. 7 is a cross sectional view of the spring of FIG. 2 in the compressed position taken along the line 7-7.

When compressed, smaller radius curves are positioned within larger radius curves. Shorter straight portions telescope within the longer straight portions. There is defined one crossover, at midpoint 33 on straight portion 32, giving a solid height of two wire diameters. As seen in FIGS. 6 and 7, in the solid height position, exit 50b of curved portion 50 rests on straight portion 82 and entrance 70a of curved portion 70, straight portion 22 rests on straight portion 42, entrance 52a of curved portion 52 rests on exit 72b of curved portion 72 and on exit 68b of curved portion 68. Similarly, entrance 50a of curved portion 50 rests on half curved portion 74, straight portion 20 rests on straight portion 44, half curved portion 48 rests on entrance 72a of curved portion 72; entrance 54a of curved portion 54 rests on exit 70b of curved portion 70, straight portion 24 rests on straight portion 40, exit 52b of curved portion 52 rests on entrance 68a of curved portion 68; exit 54b of curved portion 54 rests on entrance 70a of curved portion 70 and entrance 66a of curved portion 66, straight portion 26 rests on straight portion 38, entrance 56a of curved portion 56 rests on exit 68b of curved portion 68 and on exit 64b of curved portion 64; entrance 58a of curved portion 58 rests on exit 66b of curved portion 66, straight portion 28 rests on straight portion 36, exit 56b of curved portion 56 rests on entrance 64a of curved portion 64; exit 58b of curved portion 58 rests on entrance 66a of curved portion 66 and exit 62b of curved portion 62, straight portion 30 rests on straight portion 34, entrance 60a of curved portion 60 rests on exit 64b of curved portion 64. Entrance 62a of curved portion 62, straight portion 32 and exit 60b of curved portion 60 do not rest on any other wire portions.

As best seen in FIG. 5, when spring 10 is at free length, the pitch is variable throughout the full length. The distance between the wire at first end 12, comprising curved end portion 46, short end straight portion 80, half curved wire portion 48, straight portion 20 and entrance 50a of curved portion 50, and the midpoint of curved portion 52 defines the maximum pitch distance 100 throughout the length of spring 10. This pitch is mirrored at the second end 14, where the distance between the wire at second end 14, comprising curved end portion 76, short end straight portion 82, half curved wire portion 74, straight portion 44 and entrance 72a of curved portion 72, and the midpoint of curved portion 70 define the same pitch 100. Pitch 102, between the midpoints of curved portions 52 and 54 and between the midpoints of curved portions 70 and 68, is less than pitch 100. Pitch 104, between the midpoints of curved portions 54 and 56 and between the midpoints of curved portions 68 and 66, is less than pitch 102. Pitch 106 between the midpoints of curved portions 56 and 58 and between the midpoints of curved portions 66 and 64, is less than pitch 104. Pitch 108, between the midpoints of curved portions 58 and 60 and between the midpoints of curved portions 64 and 62, is less than pitch 106. Pitch 110, between the midpoint of curved portion 60 and the midpoint of curved portion 62, is less than pitch 108, and defines the minimum pitch throughout the spring 10. A variable spring pitch results in a variable spring rate.

While specific embodiments of the invention have been described and illustrated, such embodiments should be considered illustrative of the invention only and not as limiting the invention as construed in accordance with the accompanying claims.

The present disclosure may be embodied in other specific forms without departing from its spirit or essential characteristics. The described embodiments are to be considered in all respects only as illustrative and not restrictive.

The invention claimed is:

1. A spring comprising a continuous wire member formed into a plurality of coils along a central axis, wherein:

each of the plurality of coils comprises a plurality of straight portions extending between bend portions each extending from one of the straight portions;

the plurality of coils form a first spring body comprising at least three coils and having a first end and a second end and a second spring body comprising at least three coils and having a first end and a second end with the first end of the second spring body connected to the second end of the first spring body;

in an unloaded state the first spring body has a first unique pitch distance between bend portions of each pair of adjacent coils and the first unique pitch distance decreases from the first end of the first spring body to the second end of the first spring body and the second spring body has a second unique pitch distance between bend portions of each pair of adjacent coils and the second unique pitch distance increases from the first end of the second spring body to the second end of the second spring body; and in the first spring body each of the plurality of coils is sized to be received within a preceding coil and in the second spring body each of the plurality of coils is sized to be received within a succeeding coil such that in a compressed state a combined height of the first and second spring bodies is twice a diameter of the wire member.

2. The spring of claim 1 wherein each of said plurality of coils comprises two straight portions extending along planes substantially parallel to each other and said central axis of said spring and first and second bend portions each extending from one of said straight portions.

3. The spring of claim 2 wherein each of said first and second bend portions includes an entrance portion and an exit portion.

4. The spring of claim 3 wherein said exit portion has a bend radius less than said entrance portion.

5. The spring of claim 2 wherein each of said first and second bend portions of each coil comprises a reducing radius helical bend.

6. The spring of claim 2 wherein each of said first and second bend portions of each coil extends around a curvature of 180 degrees.

7. The spring of claim 2 wherein in the first spring body each of said straight portions of each of said coils has a length less than a preceding straight portion, and wherein in the second spring body each of said straight portions of each of said coils has a length greater than the preceding straight portion.

8. The spring of claim 2 wherein each of said straight portions of each of said coils is oriented at a pitch angle relative to said central axis, and wherein in the first spring body the pitch angle increases from the first end of the first spring body to the second end of the first spring body, and in the second spring body the pitch angle decreases from the first end of the second spring body to the second end of the second spring body.

9. The spring of claim 1 wherein the plurality of coils form a plurality of pairs of first and second spring bodies continuously formed endwise with each other.

10. The spring of claim 1 wherein said continuous length of wire has a uniform cross section therealong.

11. The spring of claim 1 wherein a first end curve and a second end curve are both on the same side of the spring such that the spring is configured to be pressed into a spring plate and a follower from one side thereof to facilitate assembly of the spring into the spring plate and follower.

12. A magazine comprising a magazine body having an internal passage, a follower and a spring plate slidably located within the internal passage, and a spring according to claim 1 retained between the follower and the spring plate.

13. The magazine of claim 12 wherein the follower and the spring plate each comprise tapered protrusions near a first lateral side thereof for permitting end portions of the spring to pass thereover, clips near a middle thereof for retaining end portions of the spring therein, and stops near a second lateral side thereof for abutting against the end portions of the spring.

14. A spring comprising a continuous wire member formed into a plurality of coils along a central axis, wherein:

each of the plurality of coils comprises a plurality of straight portions extending between bend portions each extending from one of the straight portions;

the plurality of coils form a first spring body comprising at least three coils and having a first end and a second end and a second spring body comprising at least three coils and having a first end and a second end with the first end of the second spring body connected to the second end of the first spring body;

in an unloaded state the first spring body has a first unique pitch distance between bend portions of each pair of adjacent coils and the first unique pitch distance decreases from the first end of the first spring body to the second end of the first spring body and the second spring body has a second unique pitch distance between bend portions of each pair of adjacent coils and the second unique pitch distance increases from the first end of the second spring body to the second end of the second spring body;

in an unloaded state each of said straight portions of each of said coils is oriented at a pitch angle relative to said central axis, and in the first spring body the pitch angle increases from the first end of the first spring body to the second end of the first spring body; and in the first spring body each of the plurality of coils is sized to be received within a preceding coil and in the second spring body each of the plurality of coils is sized to be received within a succeeding coil such that in a compressed state a combined height of the first and second spring bodies is twice a diameter of the wire member.

\* \* \* \* \*